(12) United States Patent
Frerman

(10) Patent No.: US 12,097,538 B2
(45) Date of Patent: Sep. 24, 2024

(54) PREVENTING FOULING OF CRUDE OIL EQUIPMENT

(71) Applicant: ConocoPhillips Company, Houston, TX (US)

(72) Inventor: Charles A. Frerman, Houston, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 0 days.

(21) Appl. No.: 17/547,962

(22) Filed: Dec. 10, 2021

(65) Prior Publication Data

US 2022/0193737 A1 Jun. 23, 2022

Related U.S. Application Data

(60) Provisional application No. 63/125,784, filed on Dec. 15, 2020.

(51) Int. Cl.
| | |
|---|---|
| *B08B 17/02* | (2006.01) |
| *B05D 3/10* | (2006.01) |
| *B05D 3/12* | (2006.01) |
| *B08B 3/02* | (2006.01) |
| *B08B 3/08* | (2006.01) |

(52) U.S. Cl.
CPC .............. *B08B 17/02* (2013.01); *B05D 3/102* (2013.01); *B05D 3/12* (2013.01); *B08B 3/02* (2013.01); *B08B 3/08* (2013.01)

(58) Field of Classification Search
CPC .. B08B 17/02; B08B 3/02; B08B 3/08; B08B 9/04; B08B 17/06; B05D 3/102; B05D 3/12; B05D 1/185; B05D 1/283; B05D 5/083; B05D 7/22; B05D 2202/00; C10G 75/04

See application file for complete search history.

(56) References Cited

U.S. PATENT DOCUMENTS

| | | |
|---|---|---|
| 4,106,950 A | 8/1978 | Grismer |
| 4,276,094 A | 6/1981 | Gutnick et al. |
| 4,295,890 A | 10/1981 | Stroke |

(Continued)

FOREIGN PATENT DOCUMENTS

| | | |
|---|---|---|
| CN | 104185314 A | 12/2014 |
| WO | 2014052940 A1 | 4/2014 |
| WO | 20210154630 A1 | 8/2021 |

OTHER PUBLICATIONS

International Search Report for PCT/US2021/062873 dated Mar. 25, 2022.

(Continued)

*Primary Examiner* — Dah-Wei D. Yuan
*Assistant Examiner* — Nga Leung V Law
(74) *Attorney, Agent, or Firm* — Boulware & Valoir PLLC

(57) ABSTRACT

A uniform oleophobic or oleo- and hydrophobic film is applied to equipment used in the petroleum industry. The methods can be applied to new equipment or equipment pulled from service, with the application process being performed in a controlled environment or the field. Applicator tools for efficient delivery and application of cleaners, solvents, and films used in the coating process are also described.

13 Claims, 9 Drawing Sheets

(56) References Cited

U.S. PATENT DOCUMENTS

| | | | |
|---|---|---|---|
| 5,674,827 A * | 10/1997 | Kawashima | C11D 7/261 |
| | | | 134/40 |
| 7,396,594 B2 † | 7/2008 | Schwartz | |
| 7,691,478 B2 | 4/2010 | Avaltroni et al. | |
| 8,178,004 B2 | 5/2012 | Hanson | |
| 8,236,426 B2 † | 8/2012 | Hanson | |
| 8,445,423 B2 † | 5/2013 | Bruner | |
| 8,524,367 B2 | 9/2013 | Hanson | |
| 8,658,258 B2 | 2/2014 | Hanson | |
| 9,078,956 B2 † | 7/2015 | Thompson | |
| 9,476,754 B2 † | 10/2016 | Drees | |
| 9,657,409 B2 | 5/2017 | Sandgren et al. | |
| 9,688,926 B2 | 6/2017 | Drees et al. | |
| 10,150,924 B2 | 4/2018 | Drees et al. | |
| 10,053,640 B2 | 8/2018 | Hanson et al. | |
| 10,059,892 B2 | 8/2018 | Drees et al. | |
| 10,822,559 B2 | 11/2020 | Drees et al. | |
| 10,934,497 B2 | 3/2021 | Drees et al. | |
| 2011/0195246 A1 * | 8/2011 | Hanson | B82Y 40/00 |
| | | | 428/421 |
| 2011/0252884 A1 † | 10/2011 | Hanscombe | |
| 2013/0074823 A1 * | 3/2013 | Kellogg | F24C 15/2057 |
| | | | 134/34 |
| 2013/0270157 A1 | 10/2013 | Ferrara | |
| 2016/0115321 A1 * | 4/2016 | Hasegawa | C09D 7/40 |
| | | | 252/387 |
| 2017/0029725 A1 | 2/2017 | Drees et al. | |
| 2017/0029726 A1 | 2/2017 | Drees et al. | |
| 2017/0029727 A1 | 2/2017 | Drees et al. | |
| 2017/0029729 A1 | 2/2017 | Drees et al. | |
| 2017/0130146 A1 | 5/2017 | Drees et al. | |
| 2018/0087157 A1 | 3/2018 | Harrison et al. | |
| 2018/0195014 A1 * | 7/2018 | Drees | C09D 5/1625 |
| 2018/0244978 A1 † | 8/2018 | Drees | |
| 2021/0198295 A1 † | 7/2021 | Patil | |

OTHER PUBLICATIONS

Tanaka, H. 'Silicon carbide powder and sintered materials.' (2011) Journal of Ceramic Society of Japan, 119 (3), 218-233.

\* cited by examiner
† cited by third party

1. Phosphonic acid reacts with the surface and creates a covalent bond at the substrate: phosphonic acid interface 2. The carbon group connected to the phosphonic acid is the functional mono layer 3. The monolayer is less than 5 nanometers thick

FIG. 2C

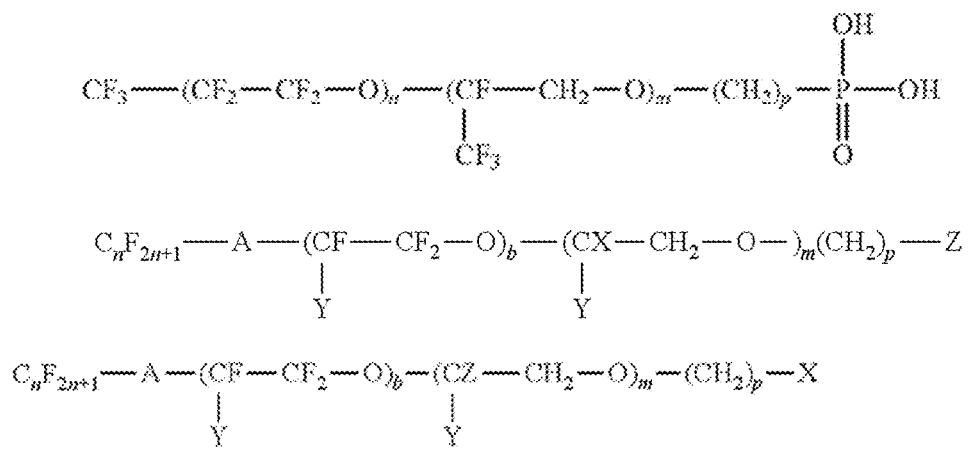

where A is an oxygen radical or a chemical bond; n is 1 to 20; Y is H, F, $C_nF_{2n+1}$, $C_nH_{2n+1}$; Z is H or F; b is 0 to 50; m is 0 to 50; p is 1 to 20; and X is a group selected from a phosphoric acid, a phosphinic acid and a phosphonic acid.

$$[M(O)_x(OH)_y(OR)_z(Q)_w]_n$$

where M is a metal, R is an alkyl group containing from 1 to 30 carbon atoms; Q is a halide group; $x+y+z+w=V$, the valence of M; x, y, z and w are at least 1; $x=V-y-z-w$; $y=V-x-z-w$; $z=V-x-y-w$; $w=V-x-y-z$; and n is greater than 2.

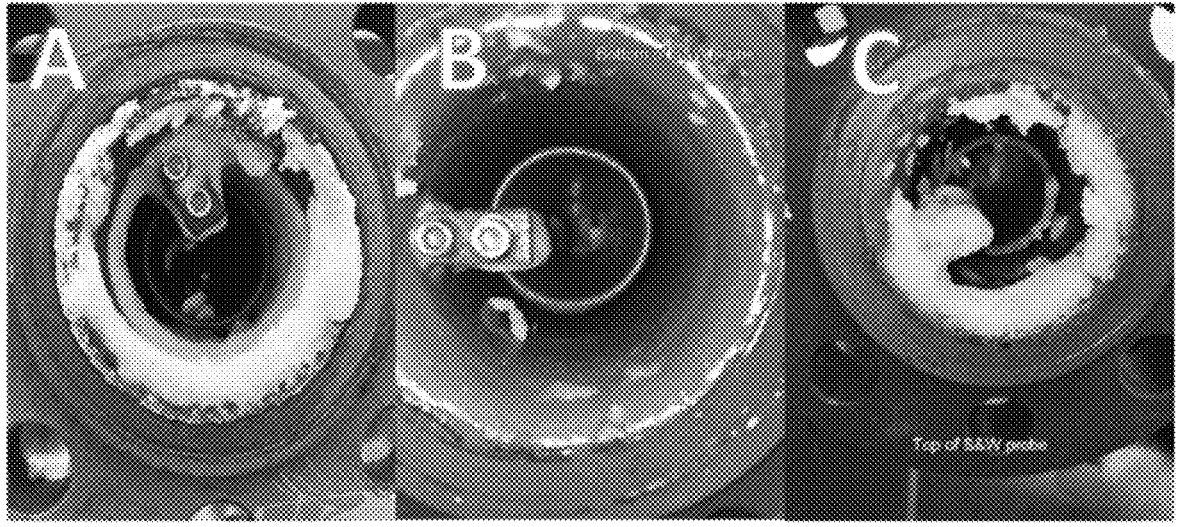
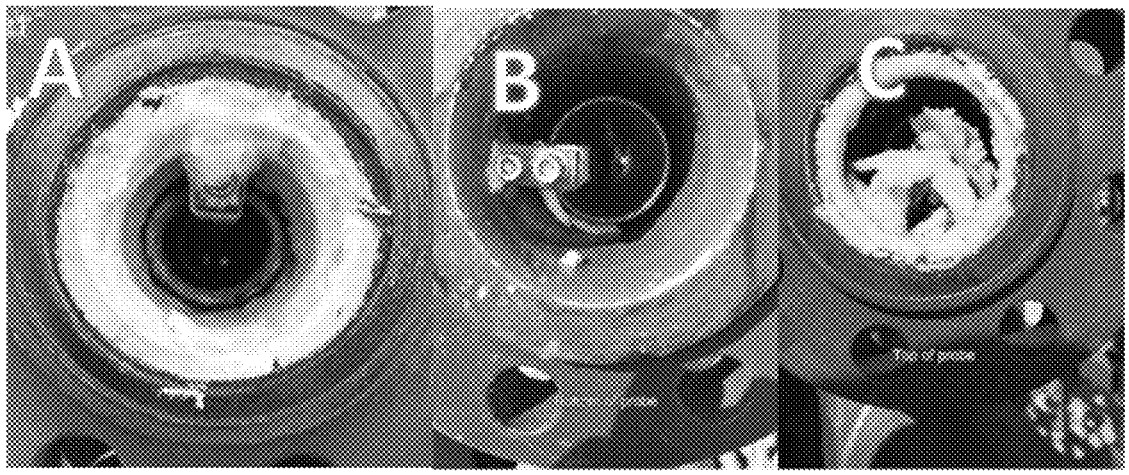

PREVENTING FOULING OF CRUDE OIL EQUIPMENT

PRIOR RELATED APPLICATIONS

This application claims priority to U.S. Ser. No. 63/125,784, filed Dec. 15, 2020, and incorporated by reference in its entirety for all purposes.

FEDERALLY SPONSORED RESEARCH STATEMENT

Not applicable.

REFERENCE TO MICROFICHE APPENDIX

Not applicable.

FIELD OF THE DISCLOSURE

The disclosure relates to compositions and methods for the mitigation of paraffin deposition and other fouling from crude oil, specifically the use of coatings on equipment used in the oil industry.

BACKGROUND OF THE DISCLOSURE

Paraffins are alkanes with the general formula of $C_nH_{2n+2}$, and can be both straight chained and branch chained compounds. These compounds are generally inert and resistant to attack by acids, bases, and oxidizing agents. Unfortunately, paraffins can precipitate and deposit onto a surface under appropriate environmental conditions. The paraffin deposits start off as a thin film, before slowly accumulating in the form of crystalline solids that collect on the surface.

Paraffin deposits are an enormously expensive problem in the petroleum industry as most crude oils contain paraffins. At the higher temperatures found in reservoirs, paraffins are dissolved in crude oil, but they begin to precipitate as temperatures drop. As such, paraffin crystallization and deposition are ubiquitous in production, transportation and processing equipment because of their relatively low operating temperatures. Almost any piece of equipment that comes into contact with the crude oil is susceptible to paraffin deposit, including surface facilities, pipelines, downhole tubulars, testing equipment, pumps, holding tanks, processing tanks, storage tanks, and containers suitable for air, road, or ocean transportation. These deposits are especially problematic for the interior of production equipment and pipelines (see e.g., FIG. 1) because the deposits restrict flow, reducing the volume of produced crude oil. Problems related to crystallization and deposition of paraffins during production and transportation of crude oil cause losses of billions of dollars every year to the petroleum industry.

Traditional methods of management and remediation have been established for many years, and include hot oiling, manual cleaning and various chemical treatments, each described in more detail below. Combinations of these three basic methodologies are also employed.

Hot Oiling. Hot oiling is often employed for removing deposition in well tubing, pipelines, and storage tanks. Paraffin buildup is addressed by periodically pumping very hot oil, augmented by cleansing additives, into the vessels in order to melt the paraffin accumulations from tank walls, sensors and internal equipment. Even though hot oiling is usually the first method tried for removing paraffin, hot oiling can potentially aggravate well problems and cause formation damage because a large amount of the oil used in the process can go into the formation.

Manual Cleaning. During normal maintenance operations, internally mounted equipment may be periodically subject to manual cleaning. This typically involves removal of sensors, instruments, and the like from out-of-service tanks and process equipment for cleaning. Alternately, personnel may physically enter out-of-service tanks to perform the cleaning with sensors and equipment in place. These methods typically involve considerable expense in time and labor for repeatedly taking equipment out of service, the cleaning process itself, and management of safety associated with hazardous conditions and the generation of hazardous waste.

Chemical Treatments. Chemical treatments are used for both management of paraffin before deposits form and to remediate deposits. While chemical treatments help to manage solids deposition, some chemicals do not suspend the paraffin indefinitely, require constant monitoring to achieve adequate performance, and may be damaging to the environment.

Several classes of chemical treatment are discussed next.

Paraffin Inhibitors. The predominant types of paraffin-control compounds are crystal modifiers and dispersants. Wax crystal modifiers, also called paraffin inhibitors, have various structures, but each have a paraffin-like component that co-crystalizes with the paraffin present in the crude. This co-crystallization distorts the growth and three-dimensional shape of paraffin crystals so that the paraffin deposits occur as small, round particles rather than acicular (needle-like) crystals. This prevents crystal growth and adherence because the round particles are less likely to attach to the walls of the pipe or to other paraffin crystals. The performance of crystal modifiers is largely dependent on proper injection point, adequate concentration, and composition of the paraffin fractions. Thus, the crystal modifiers must be continuously added to the crude oil to prevent paraffin deposits.

Paraffin Dispersants. Paraffin dispersants are surfactants that interact with paraffins in the crude oil and alter the surface energy of the paraffin crystals, which changes the energy of the interaction (interfacial energy) between the paraffin crystal and the oil. This minimizes the interaction between paraffin crystals, which helps to prevent agglomeration and deposition.

Paraffin dispersants can be applied continuously like the crystal modifiers, or in frequent batch applications. Constant monitoring is necessary, however, because the dispersants must be applied in adequate concentrations to address the paraffin of the specific crude and system conditions (e.g. oil water ratio, fluid velocity, intermittent flow). Inadequate concentration of paraffin dispersants greatly impedes their performance.

Paraffin Solvents. Additional chemical treatments for treating paraffins after they form deposits also exist. The most common treatment is paraffin solvents, which dissolve already deposited paraffin. Unfortunately, very high concentrations, large volumes and extended contact times with the paraffin deposits are required for efficacy. Solvents are largely used for remediation due to these limitations.

The common factor in each of the above chemical treatment methods is that the added chemical must interact with the paraffin in the crude oil. While the methods can reduce the amount of paraffin capable of depositing on the production equipment and pipelines, these methods typically require the continuous addition of the chemical and extended contact time between the chemical and the paraffin. Further, the chemicals must be present in every instance of crude oil contacting a surface in a sufficient amount. This requires continuous monitoring as too low of a concentration result in paraffin deposition and too high of a concentration adds costs without benefit and increases the risk of interference with other additives.

US20180142170 (U.S. Ser. No. 10/822,559) by Drees et al., describes the use of self-assembled monolayer coatings, such as silanes, to mitigate paraffin deposition, as well as equipment for such deposition. However, such coatings fail to prevent deposition/fouling of inorganic material, such as salts, mineral scale, and fail to prevent corrosion by product solids or mitigate the adhesion of biofilms which can lead to Microbial Induced Corrosion (MIC) and bacterial proliferation.

US20170130146, also by Drees, describes the use of Self-Assembled Monolayer (SAM), more specifically Self-Assembled Monolayer of Phosphonate (SAMP) coatings to prevent paraffin and asphaltene deposition. A phosphonate is a phosphorous acid that combines a reactive phosphonic acid or "reactive head group" and a carbon-based tail group connected through a stable phosphorous carbon bond (P—C). The reactive "heads" react with the surface through strong, stable metal phosphorous bonds, and the tails stick out from the surface and are chosen for their chemical functionality.

SAMP is commercially available from a wide range of suppliers. Typically, SAMP is utilized with an alcohol-based carrier which allows for rapid drying, but the SAMP may alternatively be combined with a glycol carrier for use in the treatment of components used in crude oil service operation. Many of these compounds are purely oleophobic, however, and thus are not as powerful as a combined oleophobic and hydrophobic SAM/SAMP. Hence, while an improvement, further benefits could be realized.

Related applications include US20170130145, US2017292081 (U.S. Ser. No. 10/059,892), US2014237800 (U.S. Pat. No. 9,476,754) US2016348014 (U.S. Pat. No. 9,688,926), US2017292082 (U.S. Ser. No. 10/150,924) US2017029725, US2017029726, US2017029727, US2017029728, US2017029729, US2018195014 and each describes a variety of applications of similar technology.

While SAMs and SAMPs are available for the treatment of complex and/or large equipment before sale, a need still exists for the treatment of equipment that is already in service. However, the already accumulated deposits interfere with good SAM/SAMP coverage, and thus it is not easy to treat in-service equipment.

U.S. Pat. No. 8,658,258 describes plasma treatment to prepare a substrate for a self-assembled monolayers of various types. However, plasma cleaning is expensive and difficult, and not of practical utility for most large oil field equipment.

Thus, what is needed in the art is a cost-effective way to reduce paraffin deposition that does not rely on a continuous addition of chemicals and does not harm the formation. Ideally, the new method will be applicable to both new and especially in-service equipment, and will prevent a variety of fouling elements.

SUMMARY OF THE DISCLOSURE

Described herein are methods of coating surfaces with a monolayer coating that is oleophobic or preferably both oleophobic and hydrophobic and application tools for use therewith. Once coated, the oleophobic/hydrophobic monolayer repels oil and prevents paraffin precipitates in crude oil from depositing and accumulating on the coated substrate, as well as prevents salt deposition. The oleophobic and hydrophobic monolayers do not, however, chemically react with or physically modify the paraffins or paraffin precipitates in the crude oil.

The crude oil contacting surfaces of various equipment used in oil production and transportation are cleaned and treated with solvents or other solutions applied by specialized applicator tools to prepare an activated surface. The same or a different application tool can then apply a uniform Self-Assembled Monolayer (SAM) of an oleophobic and/or hydrophobic monolayer to the activated surface, resulting in an ordered structure that is anchored to the substrate through a covalent bond. The substrate surfaces coated with the oil and water repelling monolayer then repel crude oil and a variety of organic and inorganic fouling agents, preventing the accumulation of deposits on the surface. Thus, these methods avoid the initial affixation of paraffins and other foulants to the substrate surface without the need to introduce large amounts of expensive additives to the crude oil, and without contacting the formation. The ideal method will treat only oil contacting surfaces, thus saving on reagent costs.

We have developed an improved process for the field based application of SAMs or SAMPs to achieve a uniform and complete coating to prevent organic and inorganic fouling of new or previously in-service equipment, meters and probes used in hydrocarbon production, processing and transport. The process and SAM evaluation has succeeded in achieving a high degree of monolayer formation where other applications, such as the SAMPs described in U.S. Ser. No. 10/822,559 and related patents and applications, also known as e9 treatments, have failed to achieve a uniform layer and have failed to perform. The new process has been used to achieve a high level of coverage and demonstrated performance on both new and previously in-service items made of stainless steel, carbon steel, phenolic epoxy, among other suitable substrates.

In one example, the process included the following steps:

1) Physical removal of fouling solids off surfaces with high pressure water wash and lance (rigid or flexible). The actual pressure varies depending on the substrate and deposits, but pressure ranges from 100 psi to 10,000 psi.

2) Degreasing surfaces with an aqueous alkaline degreaser. The degreaser can be comprised of NaOH, KOH, ethylene glycol, monobutyl ether, ethoxylated alcohols, sulfonic acid, their salts, among others. Heated degreaser fluids can also be used in this step, and the added heat will assist in the cleaning process. Degreasing is preferably verified with Surface Tension Pens. An ink of a minimum of 46 dynes should leave a persistent mark. If this is not achieved, repeat the degreasing step 2 and/or step 3).

3) Aqueous surfactant/detergent wash diluted in water. The mixture can be comprised of ADBAC Quat, DDBSA, sodium metasilicate, among others. Again, the fluids can be heated for use in this step. The order of the wash and degreasing step can be varied or the two steps may be combined, and one or both may be repeated.

4) Surface activation of the fully cleaned surface with a hydroxide ion containing solution. A caustic solution may include of diluted KOH, NaOH, ammonia, sodium bicarbonate, pyridine, methylamine, among others. If the order of steps 2 and 3 is reversed, the surface may be activated while degreasing.

5) Rinse and dry. Typically, the surface is rinsed and dried with an easily evaporated solvent and/or heated air flow, as needed. While not essential, this step can be performed any time before and after activation, and preferably occurs before SAM/SAMP application. Suitable solvents include alcohols, such as MeOH, EtOH, IPA, butanol, among others. If e.g., an ammonia solution is used for degreasing and/or activation the rinse dry can be omitted as the ammonia will evaporate on its own.

6) Apply SAM or SAMP product. Fluorinated materials are preferred herein as they repel both water and oil. SAM/SAMP products may include Aculon AFT, Aculon E, NanoSlic® NS-200, among others. Preferably the application is repeated 3 times to ensure complete coverage.

NanoSlic® NS-200 is a flexible coating with both hydrophobic and oleophobic properties. It exhibits superior adhesion, is temperature and thermally resistant, and provides a clear, transparent coating. NS-50 PreClean Solution—an alkaline cleaner that removes oils, films and other contaminants and simultaneously activates metallic surfaces to improve bonding, is highly recommended prior to application for maximum adhesion. NS-200 contains 20-40% Benzene, 1-chloro-4-(trifluoromethyl) (parachlorobenzotrifluoride), 20-40% acetic acid, 1,1-dimethylethyl ester, 20-40% tert-butyl acetate, 20-40% of an ambient-temperature curable resin and 3-6% of a flow agent.

In some embodiments, the product is applied with a lint free cotton applicator, or specialized tools can be used to apply to challenging configurations. Such tools may include sleeved cable loops, a rotating wicking lance with rotary union and product delivery pump, cotton mops and flex lance combinations, and the like. In other embodiments, the SAM or SAMP product can be applied with spray tip attached to a rigid or flex lance or combinations thereof. As above, specialized tools can be used, such as a spray tip affixed to rigid or flex lance or combination. In yet other methods, the item is submerged in SAM or SAMP solution for 10 minutes. This is particularly useful for small and/or complex equipment, but is not preferred for large equipment, or equipment that is fixed in situ.

7) Dry Item for at least 10 minutes. Again, it is preferred to verify the quality of the application with surface tension pens. A 30 dyne ink should bead on the surface of the substrate. Repeat from step 6 if 30 dyne ink does not bead.

The order of the above steps was designed for coating equipment already in use that has significant deposits, but some steps may be omitted if the equipment is new or less dirty and the nature of the deposits may also allow some variability. For example, solids are typically removed first, but this step may be omitted entirely if no deposits are present or if the deposits are susceptible to a chemical wash. Likewise, for the washing step, which may be before or after degreasing or omitted if not needed. If the degreasing solution contains sufficient hydroxide ions, it may simultaneously activate the surface. Rinse and dry steps may occur more than once, and may be omitted entirely, but it is preferred that a rinse and thorough dry be provided before SAM/SAMP application.

Once the equipment is coated as herein described, it may be placed in service, and may be combined with any other paraffin deposit prevention or remediation steps.

The present methods include any of the following embodiments in any combination(s) of one or more thereof:

A method of preventing organic and inorganic fouling of crude oil equipment, comprising: physically cleaning a crude oil contacting surface of a piece of crude oil equipment to remove solid material, oxidation and/or paraffin deposits; degreasing and/or washing said crude oil contacting surface; rinsing and drying said crude oil contacting surface; activating said crude oil contacting surface by applying an activating agent to expose or produce oxide and/or hydroxyl moieties; rinsing and drying said activated surface; coating said activated surface with a self-assembled monolayer (SAM) solution comprising one or more organic molecules and a solvent, each organic molecule having a head and a tail, wherein said head forms a covalent bond with said oxide and/or hydroxyl moieties and said tail is both oleophobic and hydrophobic; drying said coated surface to produce an oil and water repelling surface; and using said crude oil equipment in the production, transport or processing of crude oil, wherein less organic and inorganic fouling of said oil and water repelling surface occurs than would occur in a similar crude oil equipment that was not treated by said method.

Any method herein, wherein said physical cleaning uses a high pressure water spray, or wherein said degreasing uses a caustic solution, or wherein said washing uses a surfactant or detergent, or wherein said rinsing and drying uses an alcohol and optionally heat, or wherein said activating agent is an aqueous solution containing hydroxide ions, or combinations thereof.

Any method herein, wherein said SAM solution comprises:

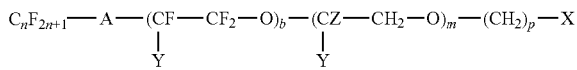

where A is an oxygen radical or a chemical bond; n is 1 to 20; Y is H, F, $C_nF_{2n+1}$, $C_nH_{2n+1}$; Z is H or F; b is 0 to 50; m is 0 to 50; p is 1 to 20; and X is a group selected from carboxylic acid, a sulfonic acid, a phosphoric acid, a phosphinic acid and a phosphonic acid.

Any method herein, wherein said SAM solution comprises alcohol or glycol and

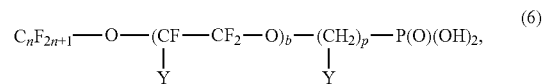

wherein Y is H, F, $C_nF_{2n+1}$ or $C_nH_{2n+1}$.

Any method herein, wherein said SAM solution is about 50-52% ethanol, about 2-3% 2 propanol and about 2-3% methanol, the remainder comprising one or both of 2-(difluoromethoxymethyl)-1,1,1,2,3,3,3-heptafluoropropane or 4-methoxy-1,1,1,2,2,3,3,4,4-nona-fluorobutan).

A method of preventing organic and inorganic fouling of crude oil equipment, comprising:
  a) cleaning a crude oil contacting surface ("surface") of a piece of crude oil equipment with a high pressure water wash to remove solids;
  b) degreasing said surface with an aqueous alkaline degreaser that is optionally heated;
  c) washing said surface with an aqueous surfactant or detergent that is optionally heated;
  d) activating said surface with an aqueous solution of a base;
  e) rinsing and drying said surface with an alcohol and optionally with heat;
  f) applying a self-assembled monolayer (SAM) or a self-assembled monolayer of phosphonate (SAMP) product to said surface after said cleaning, degreasing, washing, activating and rinsing and drying steps; and g) optionally repeating said SAM application 3 times to ensure complete coverage.

Any method herein, wherein said degreaser comprises NaOH, KOH, ethylene glycol, monobutyl ether, ethoxylated alcohols, sulfonic acid, or salts thereof, or said surfactant or detergent comprises ADBAC Quat, DDBSA, or sodium metasilicate; or said alcohol comprises methanol, ethanol, propanol, isopropanol, or butanol; or said aqueous solution of a base comprises KOH, NaOH, ammonia, sodium bicarbonate, pyridine, or methylamine, or combinations thereof.

A method of inhibiting organic and inorganic deposition on crude oil equipment, comprising: cleaning a crude oil contacting metal surface of a crude oil equipment with heat, detergent, caustic solution, mechanically or combinations thereof to remove contamination, oxidation and/or paraffin deposits; applying methanol to said cleaned surface and drying said surface; activating said dried surface with a hydroxide ion containing solution, wherein said activated surface has free and exposed oxide and/or hydroxyl moieties; drying said activated surface; coating said activated surface by applying a SAM solution comprising an alcohol and at least one molecule having a head and a tail; said head for covalently bonding with said oxide and/or hydroxyl moieties on said surface and selected from the group consisting of a phosphinic acid, a phosphonic acid, sulphonic acid, phosphoric acid, carboxylic acid; and said tail being both oleophobic and hydrophobic and selected from the group consisting of perfluorinated hydrocarbon backbone or any chemical herein described; drying said coated surface; and deploying said oil equipment so that said coated surface contacts crude oil, wherein organic and inorganic fouling is reduced as compared to similar oil equipment not treated with said method.

Any method herein, wherein said SAM solution comprises alcohol.

Any method herein, wherein said SAM solution is about 50-52% ethanol, about 2-3% 2 propanol and about 2-3% methanol, the remainder comprising one or both of 2-(difluoromethoxymethyl)-1,1,1,2,3,3,3-heptafluoropropane or 4-methoxy-1,1,1,2,2,3,3,4,4-nona-fluorobutan).

Any method herein, wherein said coating step is performed by filling said crude oil equipment with said SAM solution, or wherein said coating step is performed by spraying said crude oil contacting surface with SAM solution, or wherein said coating step is performed by wiping said crude oil contacting surface with SAM solution, wherein said coating step is performed by immersing said crude oil equipment in SAM solution.

An apparatus, comprising a piece of crude oil equipment having an oil and water repelling surface intended to contact crude oil, said oil and water repelling surface made by any method herein.

A method of preventing organic and inorganic fouling of oil equipment, comprising: activating an oil contacting surface of an item of oil equipment by applying an activating agent to expose or produce oxide and/or hydroxyl moieties using a rotating brush soaked in said activating agent; rinsing and drying said activated surface; coating said activated surface with a Self-Assembled Monolayer (SAM) solution using a rotating brush soaked in said SAM solution, said SAM solution comprising one or more organic molecules and a solvent, each organic molecule having a head and a tail, wherein said head forms a covalent bond with said oxide and/or hydroxyl moieties and said tail is both oleophobic and hydrophobic; and, drying said coated surface to produce an oil and water repelling surface; and using said item of oil equipment in the production, transport or processing of crude oil, wherein less organic and inorganic fouling of said oil and water repelling surface occurs than would occur in an item of oil equipment that was not treated by said method.

"Paraffins" or "waxes" include one or more linear and/or branched alkanes having the general formula $C_nH_{2n+2}$, wherein n is about 1 to 50, although minor amounts of longer hydrocarbon chains may be present particularly as deposited paraffin. Paraffins can also contain other chemicals in addition to straight and branched chain alkanes, such as napthalenic hydrocarbons (C30-C60).

As used herein, the term "paraffin deposits" or "deposited paraffin" indicates a solid material that is deposited on or adhered to one or more surfaces as a result of contact of the surface with a crude oil containing paraffins. The term "solid" here means the wax remains associated with the surface after contact with a crude oil, such that when the crude oil is no longer contacting the surface, the solid paraffin deposits remain on the contact surface.

As used herein, "organic fouling" includes paraffin deposits, asphaltenes and may also include biofilms to some extent. "Inorganic fouling" includes scaling, salt deposition, metals and the like.

As used herein, the term "substrate" or "surface" refers to any piece of equipment, sensor, device, or other instrument used in the petroleum industry and that comes into contact with crude oil. The equipment is not limited to any area of the industry, and can be chosen from equipment related to the production, containment, transportation, and monitoring.

As used herein, the term "activating" refers to the process of functionalizing the contact surface with moieties capable of forming covalent bonds with the SAM oleophobic layer, and the "activating agent" performs this function. The "activated surface" refers to the contact surface after it has been cleaned and undergone an activating step, but before being coating with a SAM of oleophobic monolayer. Herein we used a mild caustic solution to activate the surface.

The term "oleophobic" means to resistant to or repelling oil. Thus, 'oleophobic coating' or 'oleophobic layer' or 'oleophobic film" refers to a layer or coating that repels oil. Similarly, a "hydrophobic" surface resists contact with aqueous or polar materials.

The terms "self-assembled monolayer material" or "SAM material" refers to an oleophobic and/or hydrophobic material that spontaneously forms an ordered structure extending in a somewhat perpendicular direction from the metal substrate, with the tail groups being substantially parallel to one another. No lateral crosslinking is needed between groups, but it is not excluded. Crosslinking, for example, could be utilized to 'bridge' gaps in less than complete surface coverage.

The SAM in the present invention is anchored to an activated metal surface through an interaction with the head group of the organic molecule, usually through at least one linker atom. As used here, a "linker" atom on the head group will form at least one covalent bond with the moieties on the activated surfaces of a substrate. The 'tail' group will provide the desired oleophobic and hydrophobic characteristics on the treated surface to repel oil and water.

The "SAM solution" typically contains the SAM material dissolved in a suitable solvent, such as alcohol or glycol.

FIG. 2A displays four organic molecules self-assembled on a metal surface. Here, an organo-phosphorus acid reacted with the metal oxide group on the surface of a metal to form a covalent bond through a dehydration reaction. This allows the molecules to spontaneously arrange themselves in this ordered array. FIG. 2B displays a SAMP that is both oleophobic and hydrophobic (e.g., a SAMP from Aculon®), and FIG. 2C shows other organic molecules for use as an oleophobic layer.

The SAM exemplified herein was purchased from Aculon. All of Aculon® oleophobic treatments have the advantage of being hydrophobic as well, which results in a surface that is resistant to both organic and inorganic fouling. We have evaluated SAM-coated heat exchangers in Eagle Ford and strainer baskets in the Bakken and have seen the prevention of both salt and scale deposition, in addition to paraffin and asphaltenes in equipment coated with SAMP.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

Any claim or claim element introduced with the open transition term "comprising," may also be narrowed to use the phrases "consisting essentially of" or "consisting of," and vice versa. However, the entirety of claim language is not repeated verbatim in the interest of brevity herein.

The following abbreviations are used herein:

| ABBREVIATION | TERM |
| --- | --- |
| BS&W probes | basic sediment and water probes |
| LACT skid | Lease Automatic Custody Transfer skid—a device to measure the net volume and quality of liquid hydrocarbons and then transfer the produced oil to the pipeline. |
| SAM | Self-assembled monolayers |
| SAMP | Self-Assembled Monolayer Phosphonate |
| BS&W | Basic sediment and water |
| bbls | Barrels (42 US gallons) |
| ADBAC | alkyldimethylbenzylammonium chloride, aka Benzalkonium chloride (BZK, BKC, BAK, BAC)—a cationic surfactant |
| DDBSA | Dodecyl benzene sulfonic acid—an anionic surfactant |
| Quats | A nickname used for quaternary ammonium compounds |
| IPA | Isopropyl alcohol |
| EtOH | Ethanol |
| MeOH | Methanol |

BRIEF DESCRIPTION OF THE DRAWINGS

FIG. 2C displays other organic molecules for use in the SAM of an oleophobic material.

FIG. 6 displays pictures taken at Location 1. FIG. 6A presents an uncoated BS&W probe with paraffin deposition, FIG. 6B shows bottom of a coated probe after 3 months use, and FIG. 6C shows top of a coated probe after 3 months use.

FIG. 7 displays pictures taken at Location 2. FIG. 7A shows an uncoated BS&W probe with paraffin deposition, FIG. 7B presents bottom of coated probe after 3 months use, and FIG. 7C shows top of coated probe after 3 months use.

DETAILED DESCRIPTION

The present disclosure provides a novel method of applying an oleophobic and hydrophobic monolayer to surfaces of petroleum equipment that come into contact with crude oil, and method using such oleophobic and hydrophobic surface coatings in oil production and usage. Applicator tools to aid in even distribution of the solutions used during the application process to various shaped and sized equipment are also described, as well as oil equipment with such coatings.

The substrates treated using the described methods can be any piece of equipment or pipeline that comes into contact with crude oil, including production tubing, pipelines, turbine meters, Coriolis meters, magnetic flow meters, down hole pumps, check valves, valves, pigs, heat exchangers, basic sediment and water (BS&W) probes, storage tanks, and the like.

In some embodiments, the substrate is preferably stainless or carbon steel as the surface of these materials can be activated using the methods presently described, allowing the head groups on the SAMs to form covalent bonds with oxides on the activated surface of the steel. However, non-metallic substrates can also be treated. Such is the case for steel substrates like instruments and meters that have an epoxy and phenolic resins coating.

No significant changes are required for non-metallics that contain oxide and/or hydroxyl groups. Epoxy coatings can/have been used as to facilitate/promote SAM formation. Information on SAMs on epoxy coatings can be found in US20060166000.

Applying the solvents and/or oleophobic monolayer onto a substrate surface with a wipe is not enough to fully and uniformly coat the surface for equipment with bends, small openings, long lengths, or intricate geometries. As such, tools were designed to both ensure even distribution of the solvents, solutions, and monolayer of oleophobic product on all desired surfaces, and to address the various geometries of the substrates. The novel applicator tools described herein have been designed to be used with substrates having large lengths, sharp bends, small diameter openings, and/or surfaces requiring 360° applications (including allowing for straight, curved, notched, or bent surfaces). Further, the designs of the tools facilitate an even distribution of the monolayer material, negating the need for an added step to remove excess material or residue from the treated surfaces.

Figure 1:
FIG. 1. Paraffin or wax deposits inside used oil well tubulars.
Figure 2A:
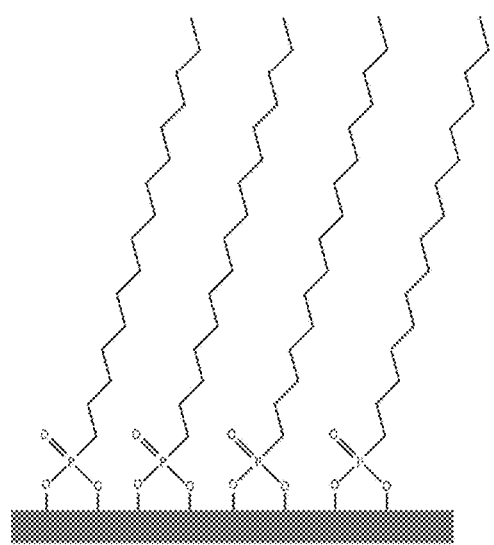
FIG. 2A. SAM of an oleophobic organic material attached to a metal surface.
Figure 2B:
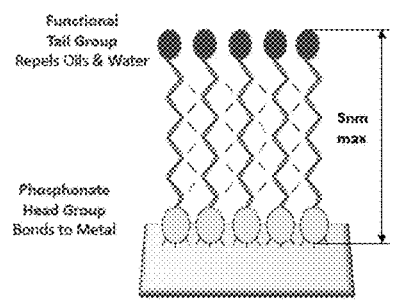
FIG. 2B shows a schematic for a SAMP from Aculon.
Figure 3A:
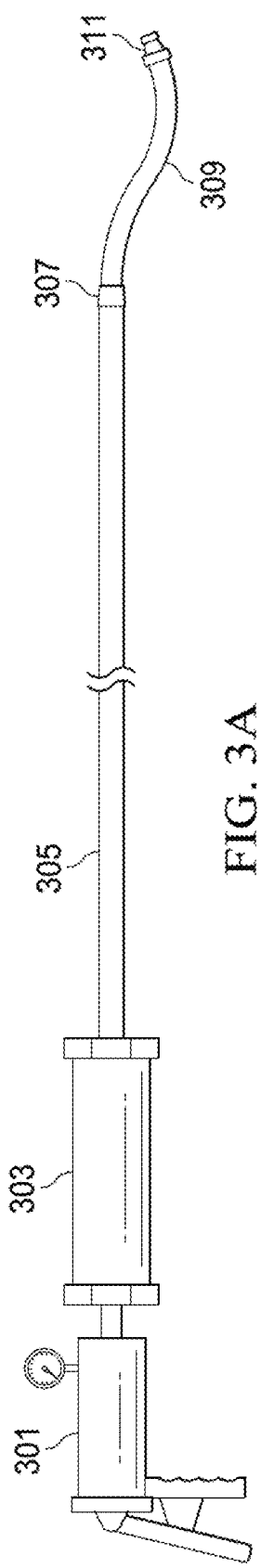
FIG. 3A-C. Schematic of application tools.
Figure 3B:
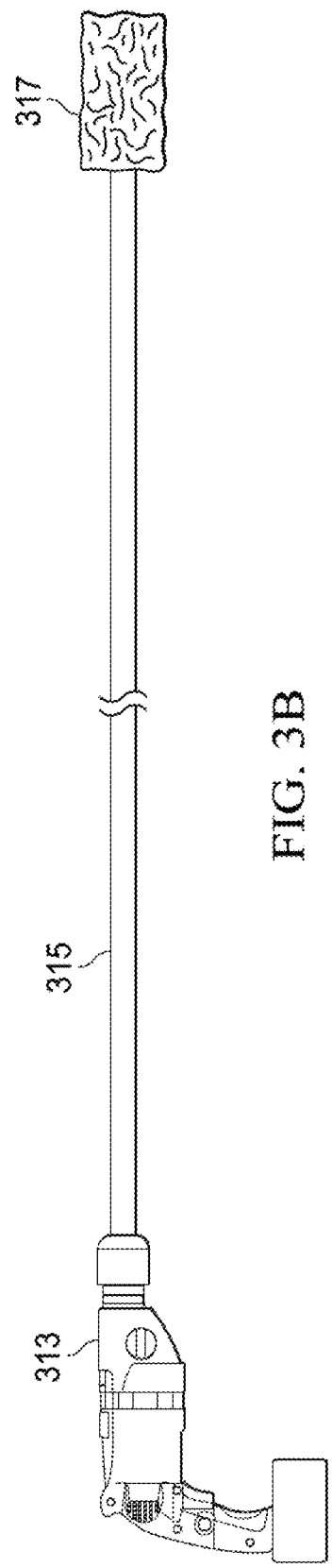
Figure 3C:
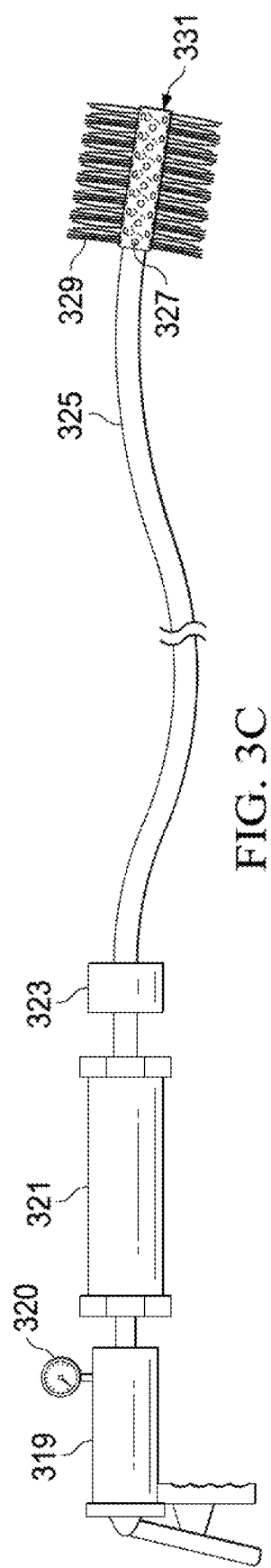

The novel applicator tools are shown in FIG. 3A-C. The tool in FIG. 3A is suitable for use in tubing, pipes, pumps, and the like wherein a small amount of flexibility in spray direction is needed to traverse gentle light bends, spray behind shoulders, and the like. It comprises a hand pump 301, fluidly coupled to a product reservoir 303, fluidly coupled to a rigid lance 305. Of course, the hand pump can be replaced with a separate or integral electronic pump, as suitable for the job at hand, in which case the reservoir location may be appropriately adjusted. The pump details are known in the art and are not illustrated herein for simplicity.

The lance is in the range of 10-40 feet long, as needed for access to pipe joints, with an internal diameter of about ⅜-⅝ inches. A flexible lance or whipstock 309 is fluidly connected to the rigid lance via a coupling 307 that allows the whip stock to rotate freely with respect to the lance. The whip has a nozzle 311 at its tip, and preferably the tips are either interchangeable or adjustable for different spray patterns, or both.

FIG. 3B shows a hybrid spray/wipe applicator tool, with a hand drill 313 providing for rotation of the tool detachably attached to a solid lance 315 tipped with a fibrous wipe 317. We used a cotton, 20 gauge, shotgun cleaner in our prototype device. This tool is dipped in the SAM solution, inserted into a pipe and rotated through the length of the pipe. The pipe is then dried, and can then be installed in oilfield equipment.

If desired, tool features of FIGS. 3A and 3B can be combined, such that the pump fluidly dispenses solution down a hollow lance, which can also be rotated.

FIG. 3C shows an embodiment that can travel through significant bends in equipment, having a hand pump 319 and pressure indicator 320 fluidly connected to product reservoir 321. Rotary coupler 323 provides a rotatable and fluidic connection to a flexible lance 325 of length about 10-40 feet, although other sizes may be suitable depending on the application. The lance has an internal diameter of ⅜ to ⅝, but other sizes are possible. The lance is provided with an end piece, called a distribution fitting or tip 331, that has holes in its surface, allowing egress of the SAM. The distribution fitting also has a wicking material (327 and 329), e.g., a fibrous material or fine bristles, for holding the SAM and conveying it to the inner surface of e.g., a piping. While the distribution fitting could be integral with the lance, it is more convenient to have a separate and exchangeable piece so that different tips can be used with the same base unit, e.g., when the wicking material degrades or when a different size is needed.

To prevent the affixation of e.g., paraffins and scale, films with dual oleophobic and hydrophobic character are preferably applied to the surface that contacts oil. Any oleophobic/hydrophobic composition that can form a strong, self-assembled monolayer that is covalently bonded to a metal contact surface can be used in the present methods. As the name implies, SAMs are monolayers of organic molecules that spontaneously form an ordered structure on a surface of a substrate, with the molecules interacting with a surface through the 'head' group of the organic molecule. The 'tail' group of the organic molecule is tailored to modify the surface properties of substrate, such as to produce an oleophobic/hydrophobic surface as required in the present disclosure. An optional spacer may be present between the head and tail groups.

Previous use of SAMs have been problematic because the interaction between the head group and the surface was not necessarily strong, with most SAMs relying on weak van der Waals forces between the organic molecules and the surface of the substrate. This weak interaction is problematic as the formed monolayer has poor durability and lacks application longevity. Thus, the presently used organic molecules have a head group that contains at least one linker atom that must form a covalent bond with the surface of the substrate to permanently change the molecular characteristics of substrate and reduce the need for reapplication.

A variety of head groups can be used on the organic molecules in the film, depending on the material of the substrate being treated. Most oil and gas equipment are stainless steel or carbon steel, which can be activated as described below to have oxide and/or hydroxyl groups on their surfaces. Thus, the head groups must be capable of forming a covalent bond with the oxides and/or hydroxyl groups.

Exemplary head groups for bonding with surface oxides/hydroxyls include alcohols, carboxylic acids, silanes, sulfonic acids, phosphinic acids and phosphonic acids. In some embodiments, phosphonic acids are preferred as they are capable of polydentate attachment to the oxides on passive stainless and carbon steel, and have hydrolytically robust binding.

For other surfaces such as epoxy and phenolic resins, US20060166000 describes a number of suitable binding groups, such as organophosphorus compounds, which binds directly to the substrate via a phosphorus-oxygen bond.

The tail of the organic molecules in the SAM imparts the new surface characteristics of the coated substrates, i.e. the ability to repel crude oil, and by extension, repel paraffin precipitates and are generally of a highly polar nature. The tail of the organic molecules is preferably hydrocarbon based, although other moieties, including fluorinated groups, can be included in the backbone of the chain. For example, the tail can have a mixture of fluoro substituted hydrocarbons and hydrocarbons containing ethylenically unsaturated groups or oxyethylene groups.

Exemplary SAMs for use in the present methods can be found in U.S. Pat. Nos. 8,524,367, 8,524,367 and 8,236,426, each incorporated by reference in its entirety for all purposes.

For example, U.S. Pat. No. 8,524,367 teaches organometallic films comprising a polymeric metal oxide with alkoxide and hydroxyl ligands and halide ligands, preferably where the metal is selected from Ti, Zr, La, Hf, Ta and W. Exemplary compounds include:

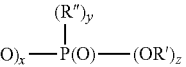

(1)

wherein x is 0-1, y is 1, z is 1-2 and x + y + z is 3.
R and R″ are each independently a radical having
a total of 1-30, preferably 6-18 carbons.
R′ is H, a metal, such as an alkali metal,
for example, sodium or potassium
or lower alkyl having 1-4 carbons such a methyl
or ethyl. Preferably at least a portion
of R′ is H. The organic component of the
phosphonic acid (R and R″) can be
aliphatic (e.g., alkyl having 2-20, preferably 6-18
carbon atoms) including an unsaturated carbon
chain (e.g., an olefin), or can be an aryl or
aryl-substituted moiety.

To provide a hydrophobic aspect to the SAM, the organo acid or derivative thereof is preferably a perfluorinated oligomer of structure:

 (2)

where $R_f$ is a perfluorinated alkyl group or a perfluorinated alkylene ether group and p is 2 to 4, preferably 2. Examples of perfluoroalkyl groups include:

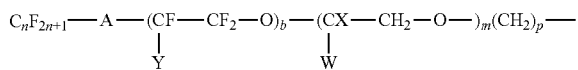 (3)

where A is an oxygen radical or a chemical bond; n is 1 to 6; Y is F or $C_nF_{2n+1}$; b is 2 to 10; W is H, F, $C_nH_{2n}$, or $C_nF_{2n}$; m is 0 to 6, and p is 0 to 18.

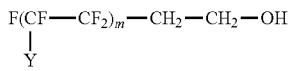 (4)

where Y is F or $C_nF_{2n+1}$; m is 4 to 20 and n is 1 to 6.

U.S. Pat. No. 8,236,426 teaches fluorinated material having the following structures:

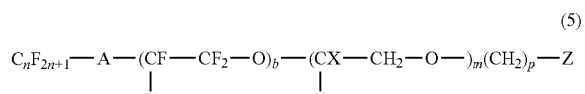 (5)

where A is an oxygen radical or a chemical bond; n is 1 to 20; Y is H, F or $C_nF_{2n+1}$; or $C_nF_{2n+1}$; X is H or F; b is at least 1, m is 0 to 50, p is 1 to 20 and Z is a phosphorus acid group.

X is:

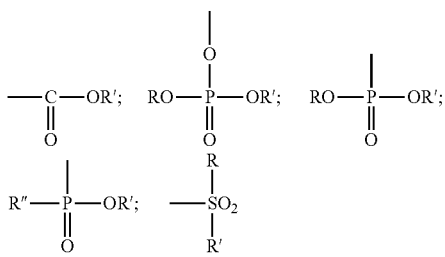 (5.2)

where R and R″ are a hydrocarbon or substituted hydrocarbon radical having up to 200, such as 1 to 30 and 6 to 20 carbons. R can also include the perfluoroalkyl groups mentioned above, and R′ is H, a metal such as potassium or sodium or an amine or an aliphatic radical, for example, alkyl including substituted alkyl having 1 to 50 carbons, preferably lower alkyl having 1 to 4 carbons such as methyl or ethyl, or aryl including substituted aryl having 6 to 50 carbons.

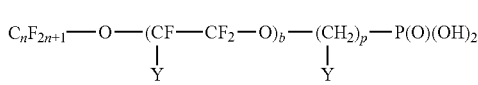 (6)

wherein Y is H, F, $C_nH_{2n+1}$ or $C_nF_{2n+1}$.

U.S. Pat. No. 8,178,004 teaches a hydrophobic coating comprising (a) a perfluorinated acid capable of forming a self-assembled monolayer on the metal substrate, (b) a surfactant, (c) an organic solvent, and (d) water. Examples include:

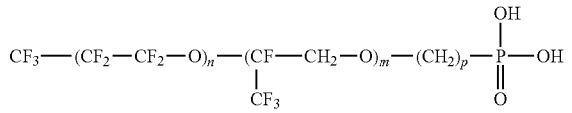 (7)

where n is equal to 1 to 14, m is equal to 1, and p is equal to 3.

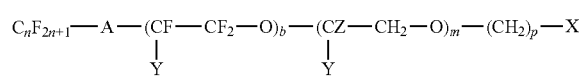 (8)

where A is an oxygen radical or a chemical bond; n is 1 to 20; Y is H, F, $C_nF_{2n+1}$, $C_nH_{2n+1}$; Z is H or F; b is 0 to 50; m is 0 to 50; p is 1 to 20; and X is a group selected from carboxylic acid, a sulfonic acid, a phosphoric acid, a phosphinic acid and a phosphonic acid.

The thickness of the monolayer film is one molecule thick. Depending on the size of the tail, the monolayer can have thickness between about 1 and about 100 nm. Preferably, the monolayer is about 1-10 nm thick, the most preferred 2-4 nm.

Figure 4:
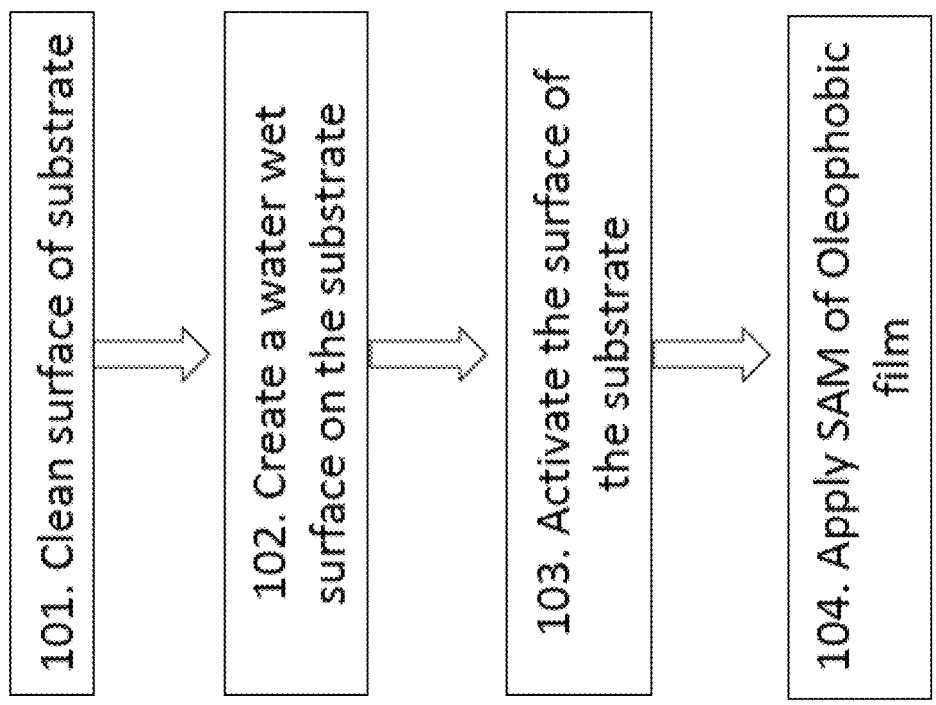
FIG. 4. One embodiment of the general preparation method for surface of a substrate in contact with crude oil.

To achieve a surface conducive to covalent bonding with the heads of the oleophobic/hydrophobic layer, novel methods of treating the substrate were developed. While the methods will vary depending on if the substrate has been in service and needs extensive cleaning, the general steps, shown in FIG. 4, are:

Clean surface debris and deposits, if needed.
Create a water wet surface;
Activate the surface; and,
Apply SAM solution to form SAM.

The application methods can be applied to both new or in-service substrates. For new pieces of equipment, the cleaning step can be skipped unless the new piece has a coating or other surface contaminant that needs to be removed before applying SAM solution. Otherwise, the first step (101) is to clean the substrate to remove surface contaminants.

For equipment that has already been in use, the cleaning step is especially important because debris and paraffin will likely already have collected on the surface. As such, thermal, chemical, or mechanical methods can be applied to remove deposited paraffin, followed by methods using soaps or detergents to clean additional debris. Alternatively, hot water (about 180° F.) with a paraffin dispersant can be circulated through the substrate to remove the paraffin before using soaps or detergents to clean the substrate. For new substrates, a simple cleaning with soaps or detergents may be all that is needed to remove dirt or other contaminants.

Any method of cleaning the metal substrates can be used, including thermal treatments to break down oil buildup, mechanical cleaning such as Ceria polish (or other polishing compound), pigging, scraping and the like, applying high pressure liquids to dislodge debris or deposits, and/or using of detergents and/or soaps. Excellent cleaning methods include hot caustic treatments (e.g., Aculon 907 (a heated caustic dip) or 905 (a room temperature caustic cleaner)), plasma cleaning, corona discharge or piranha bath ($H_2SO_4$/$H_2O_2$). However, some of these may be impractical for oil field use.

We used nonylphenol ethoxylates, sodium metasilicate and sodium percarbonate to preclean the metal surfaces before treatment with the SAM. These can leave films, however we used very dilute solutions of <100 mM, <50 mM, <10 mM, and <1 mM to avoid film deposition.

The second step (102) is to create a water wet surface on the substrate using a solvent such as methanol. Wetting steps are generally done before applying the SAMs to improve bonding. What is meant by 'water wet surface' is that aqueous liquids can directly contact the substrates surface which allow the SAM to form the monolayer. If the surface is 'oil wet' there would be a barrier preventing surface contact with aqueous solutions.

The third step (103) is to 'activate' the surface of the substrate to allow for application of a uniform monolayer surface. Any solution that reacts with the substrate to form or expose oxide or hydroxyl moieties on the surface of the substrate can be used. The presence of the oxide or hydroxyl moieties activates the surface and improves bonding of the SAMs in the next step. Exemplary solutions include caustic solutions such as KOH/NaOH, detergents or both. Acids cannot be used on metal because of the solubility of metal oxides in low pH solutions, which would tend to remove the desired functionality and create a less active surface.

The fourth step (104) in the application process applies the SAM to the activated surface only, wherein head group, typically phosphate-based, on the oleophobic/hydrophobic molecules forms a covalent bond with the oxide or hydroxyl moieties. The SAMs will not, however, be able to form covalent bonds with surfaces of the substrate that were not activated during the third step. Thus, the judicious choice of treatment surfaces can lower costs associated with wasted SAM material and removal of SAMs from undesired locations on the substrate.

An advantage of the application process and applicator tools specific to the process is the ability to coat a substrate surface in or near the field of use. This allows for substrates already in use in the field to be pulled from service, cleaned, activated, coated with the SAM, and placed back on-line without having to transport the substrate to a different location. As the SAM is covalently attached, service calls for the treated equipment are expected to decrease exponentially.

Once treated, the equipment can be put on-line and in-use, wherein the crude oil can continue to be produced, transported, measured and/or tested, or treated. As the present methods do not act by interference with the precipitation of paraffin, the treated substrates can be still used with other methods of paraffin control as required by other operations. However, the SAM of oleophobic and hydrophobic material is all that is needed to prevent deposition on the treated surface.

The present invention is exemplified with respect to BS&W probes, Coriolis flow meters, and hairpin heat exchangers. However, this is exemplary only, and the invention can be broadly applied to other equipment used in the petroleum industry, such as blowcase level bridals, level switches, chokes, valves, tuning forks, piping, tanks, and the like.

EXAMPLES

The following examples are included to demonstrate embodiments of the appended claims. These examples are intended to be illustrative only, and not to unduly limit the scope of the appended claims. Those of skill in the art should appreciate that many changes can be made in the specific embodiments which are disclosed and still obtain a like or similar result without departing from the spirit and scope of the disclosure herein. In no way should the following examples be read to limit, or to define, the scope of the appended claims.

Substrates: The substrates selected for the examples included both new and in-service equipment for use in various areas of the petroleum industry. The new equipment was cleaned to remove oils and/or surface contaminants, whereas the in-service equipment underwent a series of physical deposit removal methods.

Surface testing: The surface properties of the coated equipment were measured pre- and post-treatment with Dyne pens to evaluate the success of the application of the SAM oleophobic and hydrophobic monolayer. Briefly, when the Dyne level test pen is applied to the surface, the liquid from the pen will either form a continuous film on the surface or pull back into small droplets. If the Dyne test fluid remains as a film for 3 seconds, the substrate will have a minimum surface energy of that ink value, expressed in mN/m (Dynes). Should the Dyne test liquid reticulate or draw back into droplets in less than 1 second then the surface energy of the substrate is lower than that of the liquid itself. The exact surface energy (Dyne level) can be determined by applying a range of increasing or decreasing values of Dyne test pens and finding the break point. If the break point cannot be determined based on the range of pens available, it can only be determined that the surface energy is greater than or less than the test range.

In the present proof of concept work, reduction in the surface energy between pre- and post-treatment indicated that the SAM application was successful for the tested area. Our experiments are described in more detail next.

BS&W Probes

BS&W probes frequently experience paraffin deposition, which is only discovered by inaccurate readings that are greater than the actual BS&W content, i.e., a drift in the signal. Once a drift in the signal is noticed, the system is shut down and the BS&W probes are removed for cleaning, with oil production being temporarily diverted to tanks. Thus, BS&W probes were ideal for conducting a proof-of-concept trial as they are easily monitored for signal drift, i.e., paraffin deposition.

The general SAM application method described herein was first performed on two new BS&W probes in a laboratory setting. New probes were used to remove residual paraffin interference as a variable from the trial results, and a laboratory setting was used to eliminate poor application of SAM as a variable and to monitor the performance of the SAM layer post-application.

Cleaning. The internal parts of the probes were cleaned with a detergent to remove oils and/or surface contaminants. No thermal or mechanical cleaning was required because the probes were new.

Surface wettability. The cleaned surfaces were wiped with pure methanol and allowed to dry.

Surface Activation. To activate the internal surfaces, the surfaces were wiped with a caustic solution Aculon 907 caustic solution and allowed to dry. Aculon 907 contains a mixture of ethanol (50-52%), 2-(difluoromethoxymethyl)-1,1,1,2,3,3,3-heptafluoropropane and 4-methoxy-1,1,1,2,2,3,3,4,4-nonafluorobutan) (43-46%), 2 propanol (2-3%) and methanol (2-3%).

Film application. Two different SAM linking techniques were used to evaluate which, if either, was most persistent.

One was a SAM, the other was a sol-gel process that does not covalently bond to the substrate.

The ability of the SAM to coat the inner surface of the BS&W probes to repel paraffin in crude oil was tested at two different trial locations. The trial locations were selected by reviewing the frequency of BS&W cleaning due to paraffin deposition. Each trial location had three work orders requesting paraffin removal over a three-month period, indicating that paraffin was a significant issue in that reservoir.

Figure 5A:
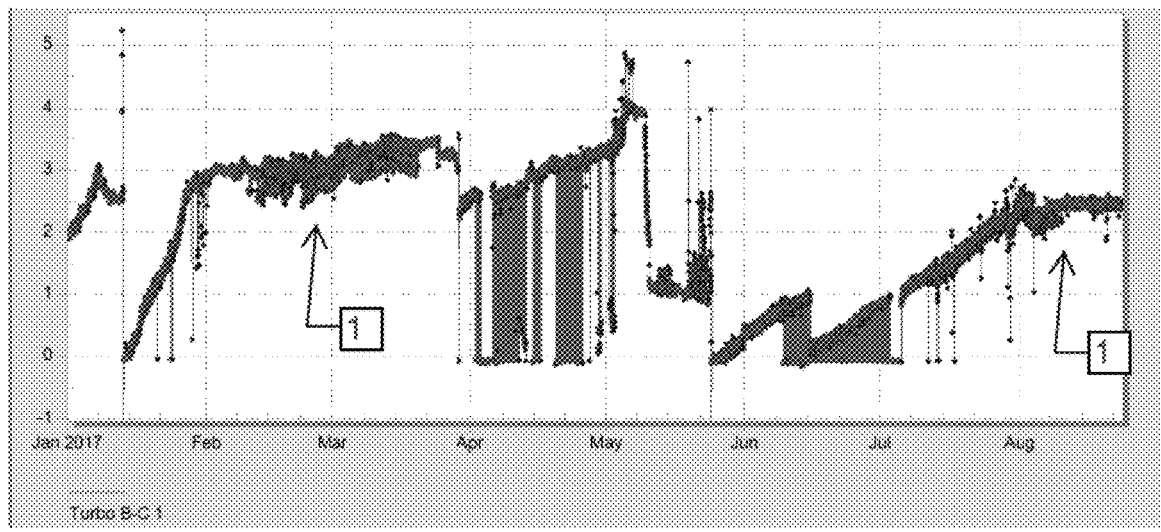
FIG. 5A is a basic sediment and water (BS&W) probe reading at Location 1 using an uncoated BS&W probe and a BS&W probe reading using a probe that has been coated with an oleophobic and hydrophobic monolayer.
Figure 5B:
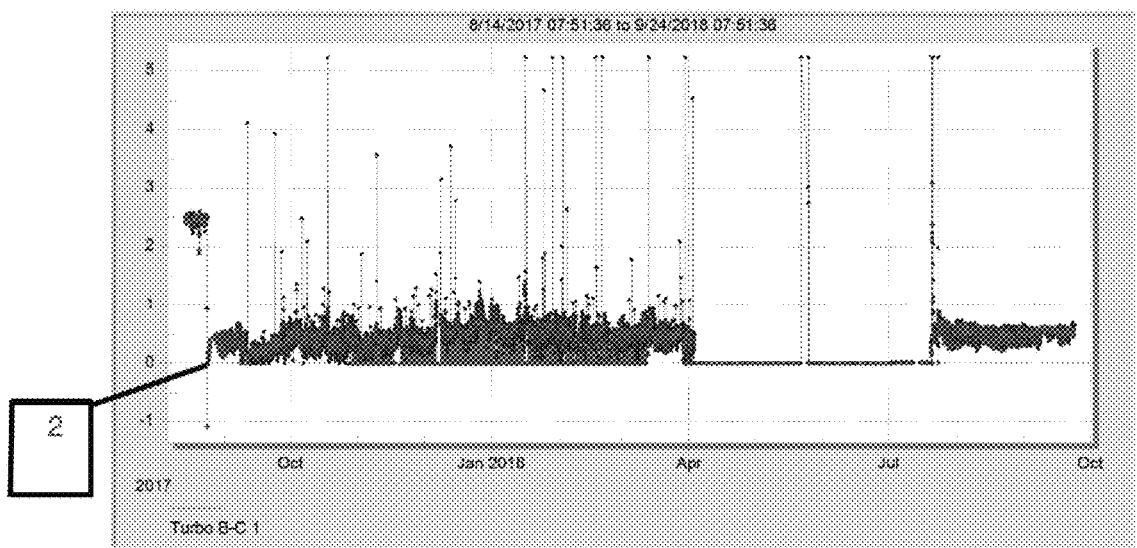
FIG. 5B is a BS&W probe reading at Location 2 using an uncoated BS&W probe and a BS&W probe reading using a probe that has been coated with an oleophobic and hydrophobic monolayer.

FIGS. 5A and 5B display the readings for locations 1 and 2 respectively, before a coated BS&W probe was installed and after the installation. Before a coated probe was used, both locations experienced drifts (1) in readings every 2-3 months. This resulted in the systems being shut down so that each probe could be removed and cleaned of paraffin deposits before being returned to service. Since the installation of a probe coated by the methods described above (2), neither location has experienced a drift in readings for over a period of a year. Thus, the film was considered to have significantly mitigated paraffin deposition on the probes (at least 4× improvement).

Both coated probes were also proactively pulled within three months of service for visual inspections. FIG. 6 displays pictures of the initial uncoated BS&W probe (6A), and the bottom (6B) and top (6C) of the coated probe after three months of service for location 1. The internal inspection of the BS&W probes showed that there were paraffin deposits at the top of the probe where the coated probe interfaced with the uncoated pipe. This is due to the pipe not having an oleophobic and hydrophobic layer to repel paraffin deposits. The SAM coated probe itself was largely free of paraffin deposition, as seen in 5B. Similar results were seen with location 2, shown in FIG. 7A-C.

Thus, this trial proved that the new BS&W probes could be coated effectively with an oleophobic and hydrophobic monolayer to mitigate paraffin deposition for period of at least a year, and quite possibly 2 years or more. The trial was then expanded to include in-service BS&W probes that were coated in the field.

Six in-service BS&W probes were pulled from service. All six probes required significant cleaning to prepare the phenolic interior surface to receive the film application. The procedure for applying the film to the previously in-service probes in the field was as follows:

Cleaning. As much paraffin as possible was physically removed from each probe. Then, the probes were soaked in a detergent solution comprising sodium metasilicate and sodium percarbonate for 12 hours. After soaking, hot water (~180° F.) with a paraffin dispersant was circulated through each probe to remove any remaining paraffin or other contaminant.

Surface wettability. Once cleaned, the internal parts of the probes were filled and soaked with an aromatic solvent for about 1 hour before the solvent was drained. Then, the internal parts were filled with methanol, but not soaked. The methanol was drained, and the internal parts were allowed to dry.

Surface Activation. To activate the internal surfaces, the surfaces were wiped with a caustic solution of NaOH and allowed to dry.

Film application. The oleophobic and hydrophobic SAM was applied with a "fill" application by filling the internals parts of the probe with the SAM solution in for 15 minutes. For the "fill" application, a blind flange was place on one side of the probe. The probe was filled with the SAM and carrier, and a blind flange was place on the other side of the probe to seal the probe. The probe was then allowed to soak for about 15 minutes with periodic agitation. The probe was opened and the SAM/carrier solution was recaptured for additional applications. The pieces were allowed to dry, allowing the SAM to bond to the activated surfaces of the internal parts.

Figure 8A:
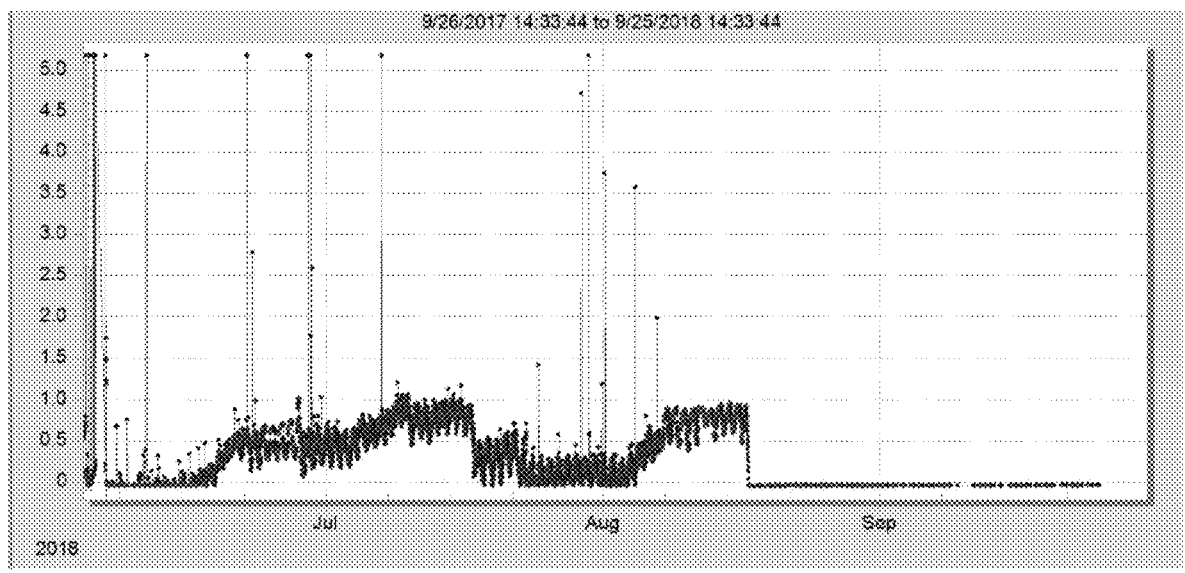
FIG. 8A displays the readings for a coated, previously in-service BS&W probe installed at Location 3.

FIG. 8A displays the readings for one of the probes installed at Location 3 on Jun. 6, 2018. The location was selected due to high BS&W readings related to paraffin deposition in the probe. The BS&W readings for this location consistently remained <1% since the probe was installed. The well has been producing to tanks since Aug. 17, 2018 and therefore no readings have been recorded since that date.

Figure 8B:
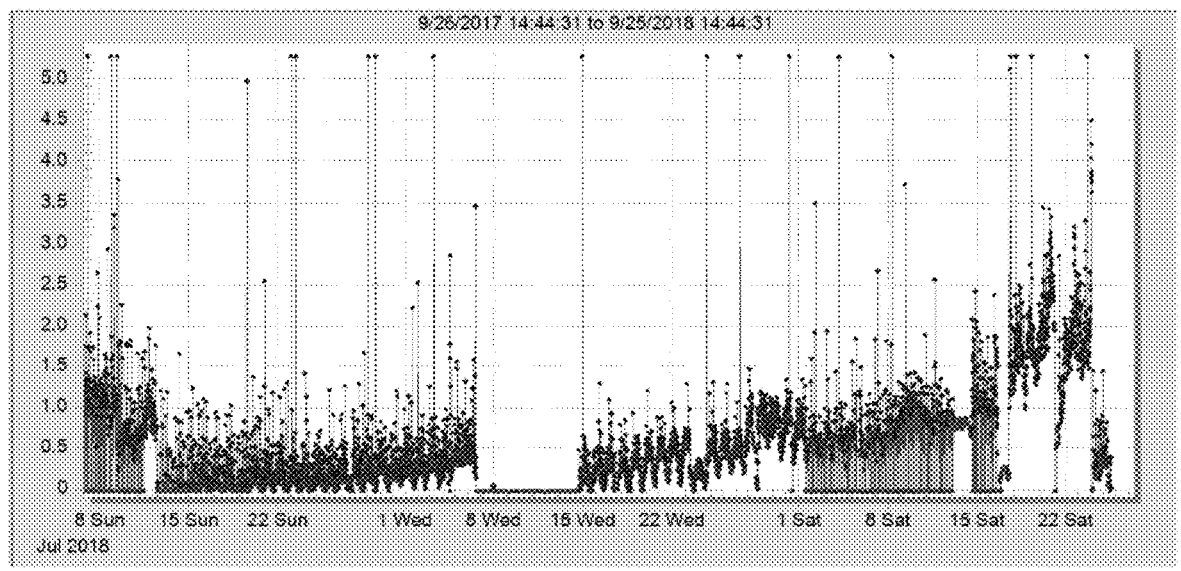
FIG. 8B displays the readings for a coated, previously in-service BS&W probe installed at Location 4.

FIG. 8B displays the readings for a second probe that was installed at Location 4 on Jul. 12, 2018, wherein previous high BS&W readings were caused by paraffin deposition. Since the installation of the coated probe, there was one event for high BS&W that occurred on Sep. 24, 2018. The event was confirmed to be due to actual water content, however, and not drift resulting from paraffin deposition.

These coated probes are still early in the life of the trial, but the initial results are extremely promising. It is clear that the field application of the SAM was successful, and that the SAM is mitigating paraffin deposition within the probes. Indeed, time between servicing for fouling can be increased at least 4-fold, and likely 4-5-fold, and possibly 6, 8, or even 10 fold.

The initial results also make clear that the process is economically efficient, as interventions to clean the BS&W probes have not been needed since the equipment was coated. The primary economic driver for coating BS&W probe was the elimination of system intervention. When the probes experience paraffin deposition, the probes require cleaning and/or removal from the system for a new probe. Based on the cost evaluation of the application of an oleophobic and hydrophobic SAM versus the cost of intervention, eliminating a single intervention per year would be a break even or slightly better return. However, as paraffin deposition is quite frequent in BS&W probes, the results indicate that multiple interventions may be eliminated. Thus, this method can be used to coat new probes as well as retro-actively coat in-service probes at problematic locations.

Coriolis Flow Meters

Coriolis flow meters are another important piece of petroleum equipment that frequently experience paraffin deposition, which results in meter factor corrections due to measurement error.

Specifically, Coriolis flow meters work on the principle that the inertia created by fluid flowing through an oscillating tube causes the tube to twist in proportion to mass flowrate. Many Coriolis flow meters have two tubes that are made to vibrate in opposition to each other by means of a magnetic coil. Sensors in the form of magnet and coil assemblies are mounted on the inlet and the outlet of both flow tubes. Under no-flow conditions, the inlet and outlet waves are in phase with each other. When fluid is moving through the tubes, the tubes twist in proportion to mass flowrate. The amount of this twist is detected by the inlet and outlet sensors, based on a phase shift (time difference) that occurs in the waves formed by the two sensors. The mass flowrate is derived from the difference in phase shift in the waves formed by the inlet and outlet sensors.

Paraffin deposition reduces the cross-sectional area of the tubes and thus increases the velocity of the fluid. As such, an adjustment is made to the meter factor to account for the error in the measurement. Specifically, increases to the meter factor occur following the monthly proving cycle because of paraffin deposits to correct oil metered versus actual. For every 10-point change (10 points=0.0010) in meter factor, there is a 100 bbls change per 100,000 bbls metered. For this reason, mitigating paraffin deposition is critical for more consistent meter factors and accurate measurements.

As before, the SAM application methods were tested on a new Coriolis flow meter. The internal surfaces of the meter are stainless steel, which has a uniform passive oxide layer. However, due to the geometry of the meter, custom applicator tools were created to deliver cleaners, solvents and filming products through a delivery tube and wick to the surface. The applicator used for the Coriolis flow meter is shown in FIG. 3C.

The trial location for the coated Coriolis flow meters was a LACT skid that had two 8" Coriolis flow meters for metering outgoing oil to Company 1 and two 8" Coriolis flow meters for metering outgoing oil to Company 2. As such, four new 8" Coriolis flow meters were obtained for the present test.

Cleaning. The internal parts of the flow meters were cleaned with a detergent (as described above) to remove oils and/or surface contaminants. No thermal or mechanical cleaning was required because the flow meters were new.

Surface wettability. The cleaned surfaces were wiped with methanol and allowed to dry.

Surface Activation. To activate the internal surfaces, the surfaces were wiped with a caustic solution (as described above) and allowed to dry.

Film application. The same SAM solution as described above was applied via a wipe application with the specially designed applicator shown in FIG. 3C to achieve 360° coverage through the bends.

The surface properties of the Coriolis flow meters were measured pre- and post-treatment with Dyne pens to evaluate the success of the application. The pre-treatment test marks ranged from 38-56 d/cm, and post treatment marks ranged from 30-42 d/cm. The reduction in surface energy indicated by the Dyne pens indicate that the film application was successful.

Figure 9A:
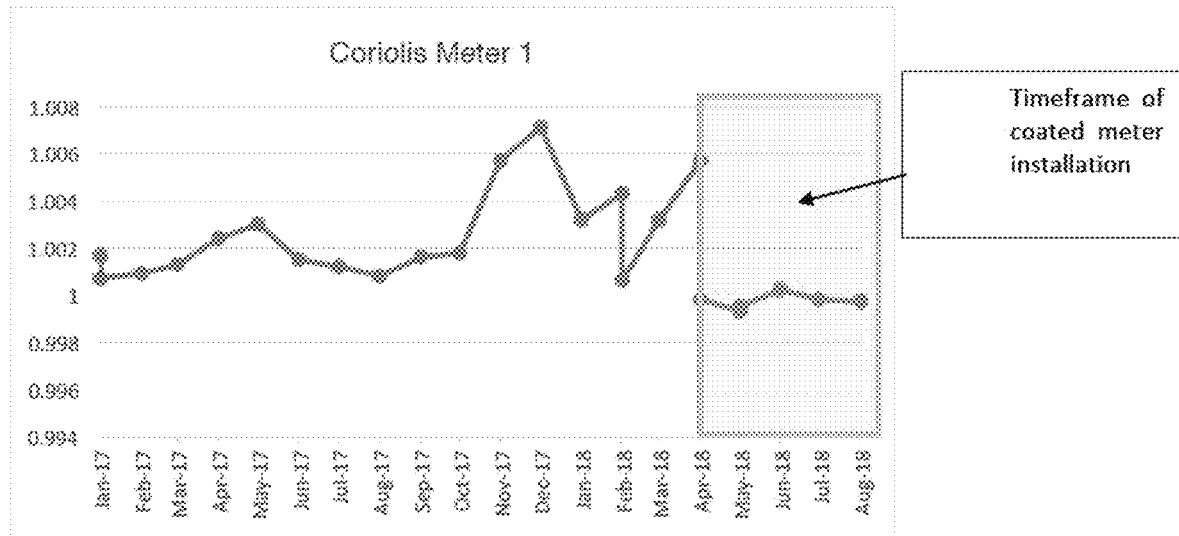
FIG. 9A displays data for Coriolis Meter 1.
Figure 9B:
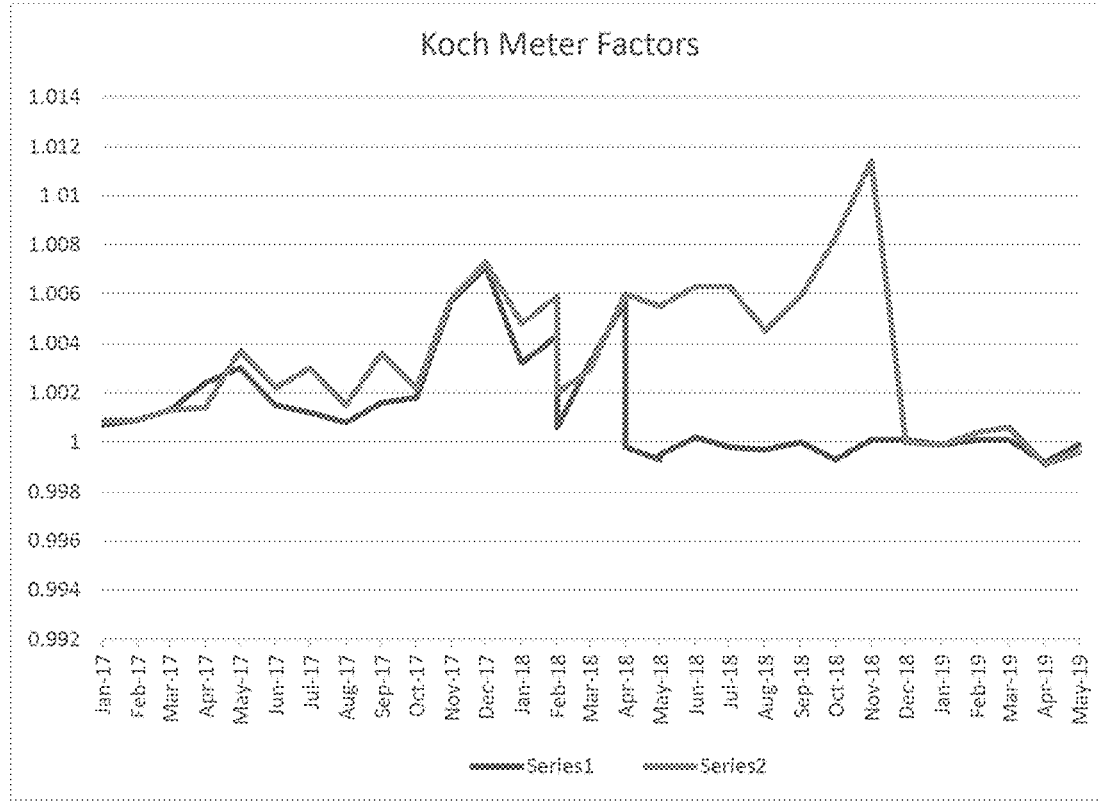
FIG. 9B displays the meter factors for one of the coated Coriolis flow meters. The blue line is the first application on the new meter that was installed March 2018. The orange line is the meter factor readings on the previously in service meter that was cleaned, activated and SAM applied.

The meter factors for one of the coated meters are displayed in FIG. 9A. The meter factors for the coated meter are highlighted in the shaded box. The values of the meter factors have smoothed out significantly by single digit points (1 point=0.0001) where double digit point changes in the past have been common. The oleophobic and hydrophobic coating has maintained consistent readings to date. Unexpectedly, higher meter factor changes due to cooler weather have not been experienced since the coated meter was installed. This in itself is a significant improvement over uncoated meter.

The primary economic driver for the Coriolis flow meter application was the accuracy of the metered oil and accounting for all oil that flows through the LACT skid. Treatment and remediation cost were negligible and were not considered. It was found that the oleophobic and hydrophobic SAM application mitigated excessive paraffin deposition and mitigated large changes in meter factors. Based on the past experience with meter factor trends and the performance to date, the application of an oleophobic and hydrophobic monolayer to Coriolis flow meter is economically viable.

Hairpin Heat Exchanger

Hairpin heat exchangers used in stabilizers were the next piece of equipment coated with oleophobic and hydrophobic SAMs. These hairpin heat exchangers experience paraffin deposition on the tube side where the stabilized condensate approaches 100° F. Paraffin deposition reduces heat exchange efficiency and increase differential pressure across the system. As such, mitigating paraffin deposition in the hairpin heat exchangers maintains heat exchange efficiency and pressure drop across the system which increases processing efficiency and reliability.

The heat exchanger used in this example was previously in-service and had significant paraffin deposition that required cleaning of the exchanger with a pressure washer and flex lance. The exchanger tubes are constructed of carbon steel and a process had to be developed to produce the proper surface properties to achieve a uniform film. A hybrid spray/wipe application was used for the final SAM application step, where the product was distributed to the surface of the tubes and wiped on with a swab attached to a rotating flex lance shown in FIG. 3B. The overall application process is below:

Cleaning. To properly clean and prepare the surface of the heat exchanger tubes, applicator tools with flexible lances and flex spray tips were designed to achieve an even distribution of detergents, solvents and caustic. The paraffin in the tubes within the heat exchanger were physically removed with a pressure washer. The tubes were then sprayed with a paraffin dispersant using the flex spray tip in FIG. 3A, and allowed to soak for about 2 hours. The exchange tube where then scrubbed using a stainless-steel brush tip applied to the rotating flex lance of the tool in FIG. 3B.

Because the tubes are constructed of carbon steel, the surface flash rusted following the pressure washing and detergent soak. As loose surface rust would result in a poor surface condition to apply the film, the tubes were scrubbed clean of loose surface rust prior to surface preparation and film application.

Surface wettability. The cleaned surfaces were wiped with methanol and allowed to dry.

Surface Activation. To activate the internal surfaces, the surfaces were wiped with a caustic solution and allowed to dry.

SAM application. For the SAM application step, a hybrid spray/wipe tool with a swab attached to a rotating flex lance (shown in FIG. 3B) was used to distribute and wipe the film on the activated surfaces of the tubes.

The quality of the SAM application was assessed near the tube sheet. It was found that the internal surface of the tube was accessible and that greater than 90% of the surface area was successfully coated. However, it was difficult to assess the SAM through the entire length of the tubes. Our results were qualitative based on dyne pen readings at the time of SAM application, but have since been evaluated and the results confirm a mostly complete SAM coating.

The results of the tests performed herein indicate that surface modification treatment with an oleophobic and hydrophobic SAM layer is an effective method of mitigating paraffin deposition. The method is cost effective because it reduces costs associated with current methods of stopping systems to pulled untreated parts. Finally, the application methods are easily adaptable to field-based environments, which means the coatings can be added to both new and used equipment. However, it is significantly easier, efficient and cost effective to apply the treatment steps and film to new equipment as there is no need to remove deposits during a cleaning step.

Additionally, the selected petroleum equipment that was coated and evaluated during the above trials were varied enough that the methods are expected to be applicable to even more equipment, such as blowcase level bridals, level switches, chokes, tuning forks, piping, and the like.

As such, any piece of equipment that comes into contact with crude is capable of being treated with an oleophobic and hydrophobic SAM to avoid the initial affixation of paraffin, asphaltenes, scale, salts etc. deposits. The application tools described herein can be used to apply a uniform monolayer to any size or shaped piece of equipment such that a permanent change is made in the molecular characteristics of the contact surface through a covalent bond between the contact surface and the SAM layer. This results in improved reliability of equipment, piping, sensors and devices, as well as providing improved operational and maintenance personnel safety.

The following references are incorporated by reference in their entirety.

U.S. Pat. No. 8,178,004, Hanson, "Compositions for providing hydrophobic layers to metallic substrates," Aculon, Inc. (2009).

U.S. Pat. No. 8,236,426, Hanson & Bruner, "Inorganic substrates with hydrophobic surface layers," Aculon, Inc. (2011).

U.S. Pat. No. 8,524,367, Hanson, "Organometallic films, methods for applying organometallic films to substrates and substrates coated with such films," Aculon, Inc. (2012).

U.S. Pat. No. 8,658,258, Hanson, "Plasma treatment of substrates prior to the formation a self-assembled monolayer," Aculon, Inc. (2010).

US20180142170, Drees, et al., "Methods of applying multi-bonded SAMPS to equipment and products and apparatus comprising SAM surfaces," Electrolab, Inc. (2018). See also all related material US20170130145, US20170130146, US2014237800 (U.S. Pat. No. 9,476,754), US2017292081 (U.S. Ser. No. 10/059,892), US2017292082 (U.S. Ser. No. 10/150,924), US2016348014 (U.S. Pat. No. 9,688,926), US2017029725, US2017029726, US2017029727, US2017029728, and US2017029729.

The invention claimed is:

1. A method of preventing organic and inorganic fouling of oil equipment, comprising:
   a) activating an oil contacting surface of an item of oil equipment by applying an activating agent to expose or produce oxide and/or hydroxyl moieties using a rotating brush soaked in said activating agent;
   b) rinsing and drying said activated surface;
   c) coating said dried activated surface with a self-assembled monolayer (SAM) solution using a rotating brush soaked in said SAM solution, said SAM solution comprising one or more organic molecules and a solvent, each organic molecule having a head and a tail, wherein said head forms a covalent bond with said oxide and/or hydroxyl moieties and said tail is both oleophobic and hydrophobic, said rotating brush comprising:
      i) a pump fluidly connected to a reservoir containing said SAM solution fluidly coupled to a rigid lance;
      ii) said rigid lance fluidly connected to a flexible whipstock via a rotary coupler that allows said flexible whipstick to rotate freely with respect to said rigid lance;
      iii) said flexible whipstock terminating in a tip having holes in its surface for egress of said SAM solution and bristles attached to said surface;
   d) drying said coated surface to produce an oil and water repelling surface; and
   e) using said item of oil equipment in the production, transport or processing of oil, wherein less organic and inorganic fouling of said oil and water repelling surface occurs than would occur in a similar item of oil equipment that was not treated by said method.

2. The method of claim 1, said method preceded by:
   a) physically cleaning said oil contacting surface to remove solid material, oxidation and/or paraffin deposits;
   b) degreasing and/or washing said oil contacting surface; and
   c) rinsing and drying said oil contacting surface.

3. The method of claim 2, wherein said physically cleaning uses a high pressure water spray of 100-10,000 psi.

4. The method of claim 2, wherein said degreasing uses a caustic solution.

5. The method of claim 2, wherein said washing uses a surfactant or detergent.

6. The method of claim 1, wherein said rinsing and drying step b) use an alcohol and optionally heat.

7. The method of claim 1, wherein said activating agent is an aqueous solution containing hydroxide ions.

8. The method of claim 1, wherein said SAM solution comprises:

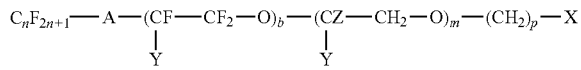

where A is an oxygen radical or a chemical bond; n is 1 to 20; Y is H, F, $C_nF_{2n+1}$, $C_nH_{2n+1}$; Z is H or F; b is 0 to 50; m is 0 to 50; p is 1 to 20; and X is a group selected from carboxylic acid, a sulfonic acid, a phosphoric acid, a phosphinic acid and a phosphonic acid.

9. The method of claim 1, wherein said SAM solution comprises alcohol or glycol and

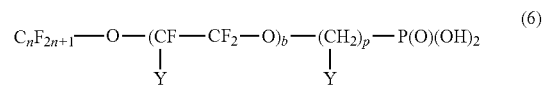

wherein Y is H, F, $C_nF_{2n+1}$ or $C_nH_{2n+1}$.

10. The method of claim 1, wherein said SAM solution is about 50-52% ethanol, about 2-3% 2 propanol and about 2-3% methanol, the remainder comprising one or both of 2-(difluoromethoxymethyl)-1,1, 1,2,3,3,3-heptafluoropropane or 4-methoxy-1,1,1,2,2,3,3,4,4-nona-fluorobutane.

11. The method of claim 1, wherein a Dyne pen is used to verify a successful application of said coating.

12. The method of claim 1, wherein said method occurs in an oil field, such that said piece of oil equipment is optionally taken off-line, and is cleaned, activated, coated with said SAM, and placed back on-line without having to transport said piece of oil equipment to a different location.

13. A method of preventing organic and inorganic fouling of oil equipment, comprising:
   a) physically cleaning an oil contacting surface of a piece of oil equipment to remove solid material, oxidation and/or paraffin deposits;
   b) degreasing and/or washing said oil contacting surface;
   c) rinsing and drying said oil contacting surface;
   d) activating said oil contacting surface by applying an activating agent to expose or produce oxide and/or hydroxyl moieties;

e) rinsing and drying said activated surface;
f) coating said dried activated surface with a self-assembled monolayer (SAM) solution comprising one or more organic molecules and a solvent, each organic molecule having a head and a tail, wherein said head forms a covalent bond with said oxide and/or hydroxyl moieties and said tail is both oleophobic and hydrophobic;
g) testing said coating of SAM on said activated surface to verify a successful application of said coating;
h) drying said coated surface to produce an oil and water repelling surface; and
i) using said oil equipment in the production, transport or processing of oil, wherein less organic and inorganic fouling of said oil and water repelling surface occurs than would occur in a similar item of oil equipment that was not treated by said method, wherein said coating is performed with a rotating wicking lance comprising:
a) a pump fluidly connected to a reservoir containing said SAM solution fluidly coupled to a rigid lance;
b) said rigid lance fluidly connected to a flexible whipstock via a rotary coupler that allows said flexible whipstick to rotate freely with respect to said rigid lance;
c) said flexible whipstock terminating in a tip having holes in its surface for egress of said SAM solution and a wicking material attached to said surface.

\* \* \* \* \*